United States Patent Office 3,130,309
Patented Apr. 21, 1964

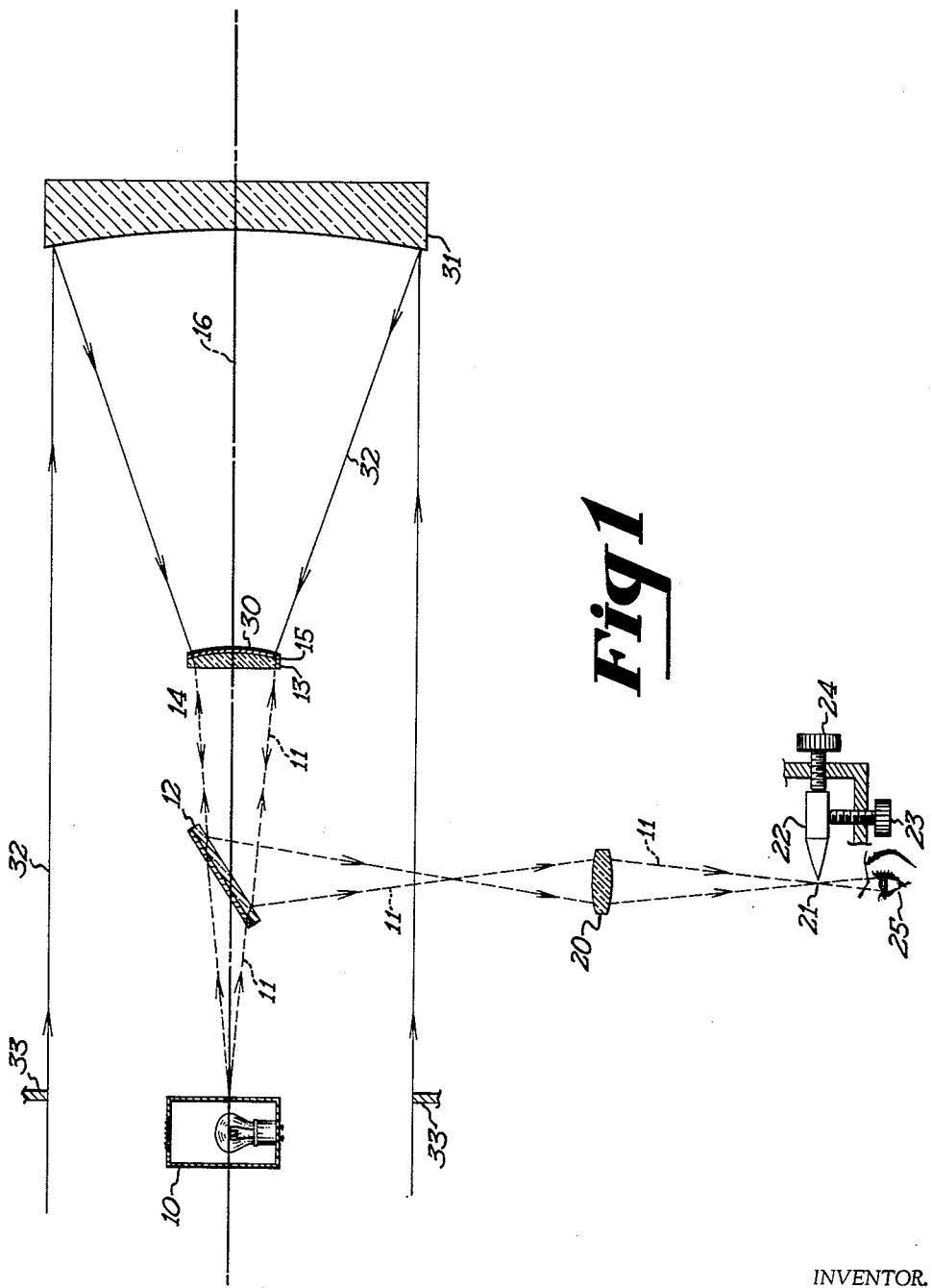

3,130,309
INFRARED VISUAL IMAGE CONVERTER WITH LENS MIRROR COATED WITH INFRARED ABSORBING MATERIAL
James H. Snyder, Wayzata, Minn., assignor to Minneapolis-Honeywell Regulator Company, Minneapolis, Minn., a corporation of Delaware
Filed Oct. 3, 1961, Ser. No. 142,597
6 Claims. (Cl. 250—83.3)

This invention relates to an infrared image system which converts infrared radiation emanating from a source into an image visible to the eye. Specifically, it relates to an arrangement whereby infrared radiation is used to heat a mirrored surface producing distortions thereon. These distortions are then viewed by an observer with optical methods.

The preferred embodiment of the invention encompasses a novel infrared converter that combines a lens mirror with a black body. The lens mirror is a mirror in which a light ray coming from a surrounding medium enters through the first surface of the lens, passes through the lens body, is reflected by the second surface and is returned back through the lens to the surrounding medium. It is to the second surface, the reflecting surface, that the black body is applied. The purpose of the black body is to absorb infrared radiations impinging thereon and further to transmit this energy to the reflecting surface of the lens mirror. The energy applied to the mirror's reflecting surface creates localized heating which expands various surface elements producing minute distortions on the mirrored surface.

To make the distortions visible, a point source of light is arranged to illuminate the entire reflecting surface of the lens mirror. The mirror will reflect the light rays at an angle determined by the relative position of each reflecting element of the mirrored surface in respect to the optical axis of the mirror. Normally, when no infrared energy is impinging on the absorbing material, the light rays reflected from each reflecting element converge at a focal point with uniform brightness. However, when infrared energy is absorbed and then transmitted to the reflecting surface, minute shifts of the reflecting elements relative position occur. These shifts cause each element to reflect light in a manner that scatters the rays at the focal point. An analysis of these scattered rays will reveal the nature of the distortions. This analysis is accomplished in the instant invention by a straight edge or knife edge positioned at the focal point, in the manner of the well known Foucault shadow test.

The objects and novelty of this invention will be apparent to those skilled in the art from the following detailed description considered in conjunction with the accompanying drawing.

Referring now to the sole figure, there is shown a novel infrared image system, in accordance with the present invention, comprising a point source of light 10 which generates rays of light depicted by numeral 11 toward a partial reflecting mirror 12. This partial reflecting mirror is well known in the prior art and is generally so made to be 50 percent transparent and 50 percent opaque. Partial reflecting mirror 12 is arranged at an angle so as to reflect light perpendicular to the optical axis 16 of the novel infrared image system. The light, after passing through mirror 12, enters lens mirror 13. Lens mirror 13 has a transparent lens material 14 to which is deposited thereto an aluminum, silver, or other metal reflecting surface 15. A lens mirror is a mirror in which the reflection occurs at the second surface. The second surface is defined in relation to a light ray which passes through the lens 14 and is reflected from surface 15 back through lens 14 and out of the lens medium. The light 11 reflected from the lens mirror 13 is returned to the partial reflecting mirror 12 which reflects the light toward a lens 20. The purpose of lens 20 is to direct the reflected light from the lens mirror 13 to a focal point 21.

At the focal point 21 is positioned a straight edge 22. This straight edge is adjustable as shown by adjustment screws 23 and 24. The straight edge provides a means to analyze the light reflected from the lens mirror 13 at the focal point 21 by a viewer's eye positioned at 25. If the surface of mirror 13 is perfectly spherical, the eye 25 will see a uniform area of brightness. If, however, there are deviations of the spherical reflecting surface of lens mirror 13, the eye will see light and dark patterns, depending on whether or not the reflected light is blocked or passed at the focal point 21. The adjustments 23 and 24 are for the purpose of moving the straight edge 22 to insure that the edge is at the focal point.

Lens mirror 13 has applied or affixed to its reflecting surface 15 an absorbing material 30. This absorbing material is any type of the commonly known absorbing blacks, such as lamp black, platinum black, gold black, or other such absorbing materials. This black can be applied to the metal 15 by any well-known means, such as depositing, painting, or by mechanically affixing thereto. This absorbing black 30 is primarily selected to absorb infrared energy and apply this energy to the metal reflecting material 15 and to the lens material 14. To direct infrared energy to the absorbing material 30, a front reflecting mirror 31 is used. This mirror 31 will reflect the infrared energy, as depicted by 32, to the absorbent material. The infrared energy 32 enters the system through an aperture stop 33 which is positioned at the center of curvature of mirror 31. The aperture stop 33 insures that the image surface of the infrared energy reflected by mirror 31 conforms to the spherical surface of lens mirror 13. The mirror 31 along with the lens mirror 13, partial reflecting mirror 12, and the point source of light 10 are positioned along the optical axis of the system.

It is recognized that the mirror 31 may be subject to inherent spherical aberrations. This occurs when the surfaces farther away from the center of the reflecting surface converge reflected radiation at an image point considerably closer to the surface than radiation reflected from the axial rays. To overcome the problem of spherical aberration, it is recognized that one could use a parabolical reflecting mirror or use a Schmidt correcting lens. Both of these are well-known in the prior art and are shown, for example, on page 82 of the book by Monk, Light, Principles and Experiments, published in 1937 by McGraw-Hill Book Company, Inc.

To sense the infrared image, the system is pointed toward the source of infrared radiation. The radiation, depicted by 32, enters through the aperture 33 and is reflected by the front reflecting mirror 31 towards the absorbing material 30 which is affixed to lens mirror 13. The infrared energy striking the absorbent material 30 causes discrete areas to rise in temperature. The temperature rise is transferred to the lens mirror 13 expanding discrete areas which in turn produce minute distortions of the reflecting surface. Since the light source 10 is constantly illuminating the reflecting surface of lens mirror 13, any distortions produced on the surface will cause light to be scattered or convergent at focal point 21. The light scattered at point 21 is analyzed by the straight edge 22 so that an eye positioned at 25 sees the contrasting shading of light and dark which represents the infrared image.

Thus there is shown and described herein an infrared image system wherein the infrared radiations are used to heat the reflecting surface of a spherical mirror producing distortions thereon. Light illuminating the spherical mirror is reflected by the mirror towards a focal point and is reflected to be either convergent or scattered at this point according to the distortions produced on the spherical reflecting surface. A straight edge placed at this focal point is used to analyze the light rays which pass to the eye of an observer.

I claim:

1. Apparatus for producing a visual image of a body which radiates discrete infrared energy, comprising: a lens mirror having a mirrored surface normally shaped to converge light at a focal point; a layer of infrared absorbing material affixed to said mirror surface and adapted to be exposed to absorb the discrete infrared energy to thus heat and distort said mirrored surface and thus to scatter light at said focal point; means to illuminate said lens mirror with light; and means to analyze the scattered light to produce a visual image of the body.

2. Apparatus for producing a visual image of a body which radiates discrete infrared energy, comprising: a lens mirror having a mirrored surface normally shaped to converge light at a focal point; a layer of infrared absorbing material affixed to said mirrored surface adapted to be exposed to absorb the discrete infrared energy, to thus heat and distort said mirrored surface and thus scatter light at said focal point; a light source having its light directed to said lens mirror; and straight edge means positioned at said focal point to analyze the scattered light and produce a visual image of the body.

3. Apparatus for producing a visual image of a body which radiates infrared energy, comprising: a lens mirror having a mirrored surface shaped to converge light at a focal point; infrared absorbing means deposited on said mirrored surface, said absorbing means being adapted to be exposed to the infrared energy to absorb the energy and to thus distort said mirrored surface to scatter light at said focal point; a straight edge positioned at said focal point; a source of light, and means directing the light from said source to said lens mirror to be reflected by said lens mirror to said edge, said edge permitting said scattered light to be analyzed so that said light received beyond said focal point represents a visual image of the body.

4. Apparatus for use in producing a visual image of a body which radiates infrared energy comprising: a lens mirror having a mirrored surface normally shaped to converge light at a focal point; infrared absorbing means deposited on said mirrored surface and adapted to be exposed to infrared energy to absorb the energy and to thus heat and distort said mirrored surface to scatter light at said focal point; a point source of light; a straight edge positioned at said focal point; means to direct said point source of light to said lens mirror, and means to direct reflected light from said lens mirror to said edge, said edge permitting said scattered light to be analyzed so that said light received beyond said focal point is a visual image of the body.

5. An apparatus for producing a visual image of a body which radiates infrared energy, comprising: a lens mirror having a mirrored surface normally shaped to converge light at a focal point; infrared absorbing means deposited on said mirrored surface and adapted to be exposed to the infrared energy from the body to absorb the energy and to thus heat and distort said mirrored surface to scatter light at said focal point; a point source of light, adjustable straight edge means positioned at said focal point; partial reflecting mirror means positioned to direct the light of said point source to said lens mirror and to further direct reflected light from said lens mirror to said edge, said edge permitting said scattered light to be analyzed so that the light received beyond said focal point represents a visual image of the body.

6. An apparatus for producing a visual image of a body which radiates infrared energy comprising: a lens mirror having a mirrored surface normally shaped to converge light at a focal point; infrared absorbing means deposited on said mirrored surface to absorb infrared energy; mirror means, means mounting said mirror means to direct infrared energy to said absorbing means so that the absorbed energy distorts said mirrored surface to scatter light at said focal point; a point source of light, means mounting said point source on the optical axis of said lens mirror; a straight edge positioned at said focal point; and partial reflecting mirror means positioned on said optical axis, said partial reflecting mirror means directing the light of said point source of light to said lens mirror and further directing reflected light from said lens mirror to said edge, said edge permitting said scattered light to be analyzed so that the light received beyond said focal point represents an image of the body.

References Cited in the file of this patent

UNITED STATES PATENTS

| | | |
|---|---|---|
| 2,362,235 | Barnes | Nov. 7, 1944 |
| 2,623,183 | Buck | Dec. 23, 1952 |
| 2,824,235 | Hahn | Feb. 18, 1958 |
| 2,855,522 | Robinson | Oct. 7, 1958 |